(12) United States Patent
Hollingshead

(10) Patent No.: US 6,353,889 B1
(45) Date of Patent: Mar. 5, 2002

(54) PORTABLE DEVICE AND METHOD FOR ACCESSING DATA KEY ACTUATED DEVICES

(75) Inventor: Dennis Hollingshead, Toronto (CA)

(73) Assignee: Mytec Technologies Inc., Toronto (CA)

( * ) Notice: Subject to any disclaimer, the term of this patent is extended or adjusted under 35 U.S.C. 154(b) by 0 days.

(21) Appl. No.: 09/078,396

(22) Filed: May 13, 1998

(51) Int. Cl.⁷ ................................................ H04L 9/00
(52) U.S. Cl. ...................... 713/169; 713/200; 713/168; 713/169; 713/171; 713/182; 713/186; 380/255; 380/259; 380/270; 705/39; 705/41; 705/44
(58) Field of Search ................................ 713/200, 202, 713/150, 168, 169, 171, 182, 185, 186; 380/255, 259, 270, 271, 277; 705/1, 13, 35, 39, 41, 44

(56) References Cited

U.S. PATENT DOCUMENTS

| | | | |
|---|---|---|---|
| 4,582,985 A | | 4/1986 | Löfberg ........................ 235/380 |
| 4,993,068 A | * | 2/1991 | Piosenka et al. .............. 380/23 |
| 5,131,038 A | * | 7/1992 | Puhl et al. .................... 380/23 |
| 5,481,610 A | * | 1/1996 | Doiron et al. ................ 380/21 |
| 5,483,595 A | * | 1/1996 | Owen .......................... 380/23 |
| 5,623,637 A | * | 4/1997 | Jones et al. .................. 395/491 |
| 5,680,460 A | * | 10/1997 | Tomko et al. ................ 380/23 |
| 5,937,065 A | * | 8/1999 | Simon et al. ................. 380/9 |
| 6,011,858 A | * | 1/2000 | Stock et al. ................. 382/115 |
| 6,016,476 A | * | 1/2000 | Maes et al. .................. 705/1 |
| 6,035,398 A | * | 3/2000 | Bjorn ......................... 713/186 |
| 6,038,551 A | * | 3/2000 | Barlow et al. ............... 705/41 |
| 6,038,666 A | * | 3/2000 | Hsu et al. ................... 713/186 |

\* cited by examiner

Primary Examiner—Albert Decady
Assistant Examiner—Paul E. Callahan
(74) Attorney, Agent, or Firm—Dykema Gossett PLLC

(57) ABSTRACT

Data key actuated devices such as high security doors are modified so that they periodically transmit an identity pattern. An authorized user is provided with a portable access device storing keys for a number of such key actuated devices, with each key associated with an identity pattern for that device. The portable access device has a stored template comprising a fingerprint of the authorised user combined with a verification code. When the authorized user applies their fingerprint to the portable access device, the verification code is returned which allows verification of the user. If the access device then receives a key actuated device identifier matching one in storage, the associated access key is retrieved and transmitted to the key actuated device to allow access to the user.

16 Claims, 2 Drawing Sheets

PORTABLE DEVICE AND METHOD FOR ACCESSING DATA KEY ACTUATED DEVICES

FIELD OF THE INVENTION

This invention relates to a method for accessing data key actuated devices, a portable device for accessing such key actuated devices, and a secure access system.

BACKGROUND OF THE INVENTION

Access to an increasing number of devices is controlled by data access keys. For example, access to an automated teller machine (ATM) is controlled by keypad entry of an appropriate personal identification number (PIN). Similarly, access to high security doors may be controlled by keypad entry of a pass code. Access to security systems, computer networks, and voice mail systems are also typically pass code controlled. As the number of devices which demand an access key for access increases, it becomes more difficult for a user to recall all the necessary access keys. Furthermore, the security of such key actuated devices may be compromised if the access key is not maintained in strict secrecy by the authorized user.

This invention seeks to overcome drawbacks of known security systems.

SUMMARY OF THE INVENTION

According to the present invention, there is provided a method for accessing data key actuated devices, comprising the steps of: receiving a key actuated device identifier; receiving a biometric; determining whether said received biometric is an authorized biometric; where said received biometric is an authorized biometric, comparing said received key actuated device identifier with stored key actuated device identifiers and, on finding a matching stored key actuated device identifier, retrieving a stored access key associated with said matching stored key actuated device identifier; and transmitting said retrieved access key.

According to another aspect of the invention, there is provided a portable electronic access device comprising: a biometric input; a verifier responsive to said biometric input for verifying that a biometric which is input to said biometric input matches an authorised biometric and providing a verification indication; a memory storing a plurality of access keys, each for use in accessing a key actuated device and a plurality of key actuated device identifiers, each associated with one of said plurality of access keys; a receiver for receiving a key actuated device identifier; a comparator for, responsive to a verification indication from said verifier, comparing a received key actuated device identifier with said stored key actuated device identifiers and, on finding a matching stored key actuated device identifier, retrieving a stored access key associated with said matching stored key actuated device identifier; and a transmitter for transmitting a retrieved access key.

BRIEF DESCRIPTION OF THE DRAWINGS

In the figures which illustrate an example embodiment of the invention.

DETAILED DESCRIPTION OF THE PREFERRED EMBODIMENTS

Figure 1:
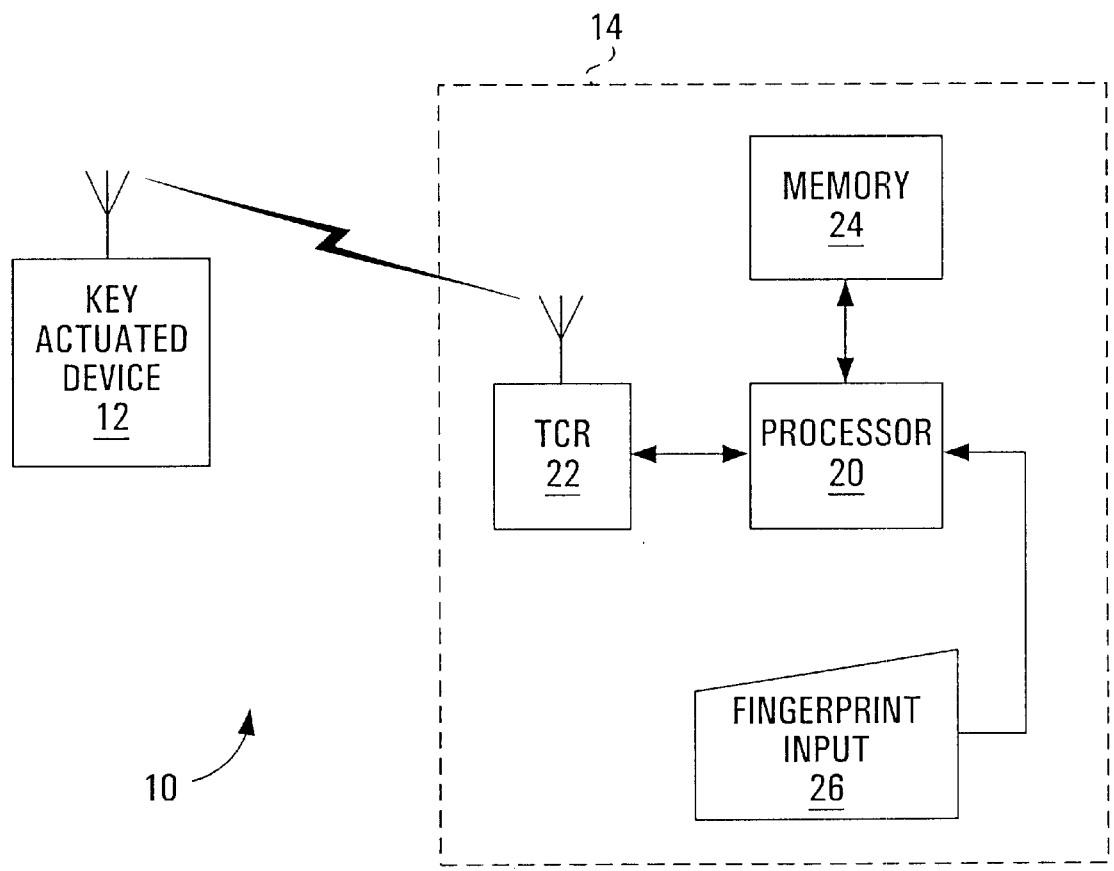
FIG. 1 is a block diagram of a secure access system made in accordance with this invention.

Turning to FIG. 1, a secure access system 10 comprises a data key actuated device 12 and a portable key access device 14. The key actuated device 12 could be a high security (vehicle or installation) door, an ATM, a security system, a computer network, a voice mail system or any other device requiring a data key for access. The key access device 14 comprises a processor 20 connected for two-way communication with a transceiver 22 and for two-way communication with a memory 24. The processor also receives signals from fingerprint input 26. Memory 24 is non-volatile and stores a plurality of access keys each for use in accessing a key actuated device. The memory also stores a plurality of key actuated device identifiers, each associated with one of the plurality of stored access keys. The transceiver 22 is wireless and may communicate with the key actuated device via radio transmissions or infrared transmissions. The key access device 14 is portable and preferably battery powered. A switch (not shown) may disconnect the battery when the device is not in use to conserve battery power.

In order to use the portable access device, a user must first be enrolled. To effect enrolment, the user must pass a digitized copy of their fingerprint to an enrolment computer. This may be accomplished by the user applying their finger to the fingerprint input 26 of the access device 14 when the device is connected via a port (not shown) to the enrollment computer so that the processor 20 of the access device is prompted to pass along the digitized fingerprint image to the enrollment computer. Alternatively, the user may apply their fingerprint directly to a fingerprint input associated with the enrolment computer. This computer then calculates a template from the user's fingerprint which is an encrypted combination of the fingerprint with a verification code. Suitable techniques for obtaining such templates from a fingerprint and a code, and for recovering a code from such a template, are described in U.S. Pat. No. 5,680,460 entitled BIOMETRIC CONTROLLED KEY GENERATION to Tomko et al., the contents of which are incorporated by reference herein. This template is then downloaded to the portable access device and stored in memory 24. Further, the enrolment computer stores a verification indication at an address in memory 24 indicated by the verification code. Enrollment is then completed.

Figure 2:
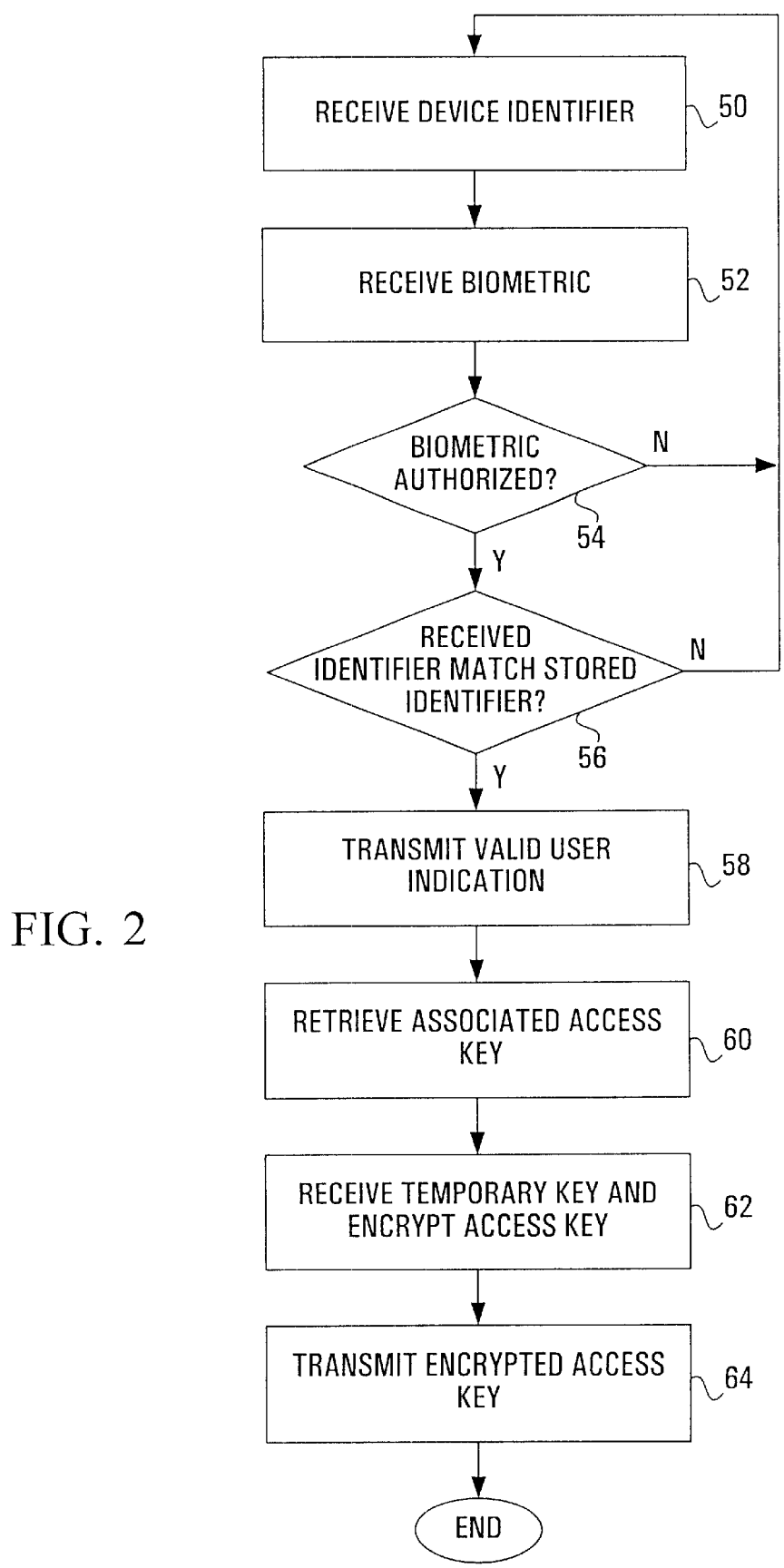
FIG. 2 is a flow diagram for operation of the process of FIG. 1.

Operation of the system 10 of FIG. 1 is described in conjunction with FIG. 1 along with FIG. 2, which illustrates program control for processor 20. Key actuated device 12 periodically transmits a device identifier. It is generally preferred that the time between such transmissions is no more than about five seconds; the range of these transmissions is preferably about two meters. When the portable access device 14 is brought within range of the transmissions of the key actuated device and is turned on, transceiver 22 will receive these transmissions and pass along the key actuated device identifier to processor 20 (block 50). If the user of the portable access device then applies their fingerprint to fingerprint input 26, the fingerprint image is also received by processor 20 (block 52).

The processor may then determine whether the fingerprint which was input is that of the authorized user. This is accomplished by the processor retrieving the template stored in memory 24 on enrollment and combining this with the newly input fingerprint from input 26. The resulting verification code is used as a memory address to memory 24. If the processor finds a verification indication at this memory address in memory 24, then the biometric is considered to be authorised (block 54). In such case, the processor compares the received key actuated device identifier with key actuated device identifiers in memory. On a match being found (block 56) the processor passes a valid user indication to transceiver 22 for transmission to the key actuated device 12

(block 58). This valid user indication could comprise the verification code, or an encrypted version of same. Additionally, the processor retrieves the access key from memory 24 which is associated with the matching key actuated device identifier (block 60).

When the key actuated device 12 receives a valid user indication from access device 14, it transmits a one time temporary encryption key. This is received by transceiver 22 and passed to processor 20. Processor 20 uses the temporary key to encrypt the retrieved access key (block 62). The encrypted access key is then passed to the transceiver 22 and transmitted to the key actuated device (block 64). The key actuated device uses a decryption key to recover the decrypted access key and, if the resulting decrypted key is a valid key, allows access to the user. Where the key actuated device is a high security door, this results in the door being unlocked. Where the key actuated device is an ATM, this would allow the user access to the device via a keypad which could be provided on the portable access device 14.

It will be apparent that since the access device 14 stores a number of key actuated device identifiers and associated access keys, device 14 may be carried around by an authorised user and used to gain access to a number different key actuated devices without need of the user to memorize a plurality of pass codes.

The portable access device may be used with an existing key actuated device by modifying the device to incorporate a transceiver in same and programming the processor of the key actuated device so that the device functions in the manner described.

A number of modifications to the system as described are possible. For example, the valid user ID may be transmitted as soon as an authorised fingerprint is received by the access device 14 in advance of determining whether the received key actuated device identifier matches one of the stored identifiers.

Optionally, for lower security applications, the portable access device does not transmit a valid user indication, nor does the key actuated device transmit any temporary keys. Instead, for such applications, on access device 14 determining that an authorised user has applied their fingerprint to the input and on finding an access key for the key actuated device, this access key is transmitted in unencrypted form to the key actuated device.

Another option is for the key actuated device 12 to send a "medium security" indicator when it wants the access device 14 to send a verification code and receive a temporary key for encrypting the access keys prior to transmission and to send a "low security" indicator, or no security indicator, when it wants the access device 14 to follow the described low security option.

A high security option is for the access keys to be encrypted in the access device 14. To accomplish this option, on enrolment, as well as forming a template from the user's fingerprint and a verification code, a template is formed from the user's fingerprint and a special key. The special key is then used to encrypt each access key. In operation, when the access device 14 receives a key actuated device identifier and a user's fingerprint, it retrieves any associated encrypted access key and both templates. If the fingerprint is that of the authorised user, the fingerprint successfully returns the verification code from the one template. This results in the access device 14 sending a verification indication to the key actuated device 12. The key actuated device responds by sending a temporary encryption key. The access device then uses the fingerprint to return the special key from the other fingerprint template and the special key is then used to decrypt the access key. The access device 14 next uses the temporary key to encrypt the access key and sends the encrypted access key to the key actuated device 12.

While in the described embodiment the user is authorised solely at the portable access device, it would be possible for the key actuated device to participate in this authorization. More particularly, on enrolment, the enrolment computer could simply pass the template to the portable access device and not the verification indication. In such instance, when a biometric is input to the access device, a verification code is returned and this code is passed directly (in encrypted or unencrypted form) to the key actuated device. The key actuated device could then pass the code to a central database which would use it to look up whether the code was indicative of a valid user. If so, the key actuated device would prompt the access device to continue. Further the key actuated device would only respond to any key transmitted by the access device where the key actuated device determined the user was authorised.

In circumstances where the access device is to transmit a valid user indication and the key actuated device is to respond with a temporary key, the valid user indication is conveniently the (encrypted or unencrypted) recovered verification code and the prompt from the key actuated device is conveniently the temporary key.

While device 14 is shown for use with a fingerprint input, equally any other user biometric could be employed. For example, access device 14 could scan an iris of a user.

Since any biometric verification device will have a non-zero false acceptance rate, preferably the key access devices 14 is programmed to shut down or broadcast an alarm code after a pre-determined number of consecutive failed verification attempts by a user.

Other modifications will be apparent to those skilled in the art and, therefore, the invention is defined in the claims.

What is claimed is:

1. A method for accessing data key actuated devices, comprising:

receiving a key actuated device identifier from a key actuated device;

receiving a biometric;

determining whether said received biometric is an authorized biometric;

comparing said received key actuated device identifier with stored key actuated device identifiers and, on finding a matching stored key actuated device identifier and where said received biometric is an authorized biometric, retrieving a stored access key associated with said matching stored key actuated device identifier; and transmitting said retrieved access key.

2. The method of claim 1 further comprising:

responsive to determining said received biometric is an authorized biometric, initially transmitted a valid user indication;

subsequently receiving a temporary key; and encrypting said retrieved access key with said temporary key prior to transmission of said retrieved access key.

3. The method of claim 2 wherein said initially transmitting a valid user indication is dependent upon finding a stored key actuated device identifier matching said received key actuated device identifier.

4. The method of claim 2 wherein each said stored access key is encrypted and including performing a decryption operation on a retrieved access key prior to encrypting said retrieved access key with said temporary key.

5. The method of claim 4 wherein said access keys are encrypted with a special key and wherein said performing a decryption operation comprises retrieving a template and attempting to recover said special key from said template utilizing said received biometric.

6. The method of claim 5 wherein said initially transmitting a valid user indication is dependent upon finding a stored key actuated device identifier matching said received key actuated device identifier.

7. The method of claim 1 wherein said determining whether said received biometric is an authorized biometric comprises utilizing a template comprising said authorized biometric and a verification code such that presence of said biometric allows recovery of said verification code.

8. A portable electronic access device comprising:
   a biometric input;
   a verifier responsive to said biometric input for verifying that a biometric which is input to said biometric input matches an authorized biometric and providing a verification indication;
   a memory storing a plurality of access keys, each for use in accessing a key actuated device and a plurality of key actuated device identifiers, each associated with one of said plurality of access keys;
   a receiver for receiving a key actuated device identifier;
   a comparator for, responsive to a verification indication from said verifier, comparing a key actuated device identifier received from a key actuated device with said stored key actuated device identifiers and, on finding a matching stored key actuated device identifier, retrieving a stored access key associated with said matching stored key actuated device identifier; and
   a transmitter for transmitting a retrieved access key.

9. The device of claim 8 wherein said stored access keys are encrypted and including a decrypter for decrypting a retrieved access key prior to said access key being transmitted by said transmitter.

10. The device of claim 9 wherein said memory is also for storing a special key template, said access keys are encrypted with a special key and said decrypter is responsive to said biometric input to perform a special key recovery operation on said special key template utilizing said input biometric and a subsequent decrypting operation on said retrieved access key utilizing a recovered special access key.

11. The device of claim 8 wherein said verifier is for accessing a stored template comprising said authorized biometric and a verification code, for attempting to recover said verification code from an in put biometric and for using said verification code to obtain said verification indication.

12. The device of claim 8 wherein said transmitter is also for initially transmitting a valid user indication in response to said verifier providing said verification indication and wherein said receiver is also for receiving a temporary key after said transmitter has transmitted said valid user indication, and including an encrypter for encrypting said retrieved access key with said temporary key prior to transmission of said retrieved access key by said transmitter.

13. The device of claim 8 wherein said receiver comprises one of a radio receiver and an infrared receiver and said transmitter comprises one of a radio transmitter and an infrared transmitter.

14. A secure access system, comprising:
   a data key actuated device for periodically transmitting a key actuated device identifier;
   a portable access device comprising:
      a biometric input;
      a verifier responsive to said biometric input for verifying that a biometric which is input to said biometric input matches an authorized biometric and providing a verification indication;
      a memory storing a plurality of access keys, each for use in accessing a key actuated device and a plurality of key actuated device identifiers, each associated with one of said plurality of access keys;
      a receiver for receiving said key actuated device identifier;
      a comparator for, responsive to a verification indication from said verifier, comparing a key actuated device identifier received from said key actuated device with said stored key actuated device identifiers and, on a match, retrieving an access key associated with said matching stored key actuated device identifier; and
      a transmitter for transmitting a retrieved access key to said key actuated device.

15. The system of claim 14 wherein said transmitter is also for initially transmitting a valid user indication in response to said verifier providing said verification indication to said access device and wherein said key actuated device is also for, responsive to receiving said valid user indication, transmitting a temporary key, and wherein said receiver is also for receiving said temporary key, and wherein said access device includes an encrypter for encrypting said retrieved access key with said temporary key prior to transmission of said retrieved access key by said transmitter.

16. The system of claim 15 wherein said transmitter is a radio transmitter and said receiver is a radio receiver.

* * * * *